(12) United States Patent
Hsu et al.

(10) Patent No.: US 12,499,509 B2
(45) Date of Patent: Dec. 16, 2025

(54) TIME DIVISION BASED BAND PASS IMAGE GENERATION METHOD AND TIME DIVISION BASED BAND PASS IMAGE GENERATION SYSTEM CAPABLE OF GENERATING SINGLE-BAND PASS IMAGES AND DUAL-BAND PASS IMAGES

(71) Applicant: WELTREND SEMICONDUCTOR INC., Hsinchu (TW)

(72) Inventors: Te-Wei Hsu, Hsinchu (TW); Ta Hsien, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 303 days.

(21) Appl. No.: 18/507,112

(22) Filed: Nov. 13, 2023

(65) Prior Publication Data

US 2025/0054101 A1    Feb. 13, 2025

(30) Foreign Application Priority Data

Aug. 7, 2023   (TW) .................................. 112129526

(51) Int. Cl.
   *G06T 3/40*       (2024.01)
   *G06T 3/4015*     (2024.01)
   *G06T 5/50*       (2006.01)
   *H04N 23/11*      (2023.01)

(52) U.S. Cl.
   CPC ............. *G06T 3/4015* (2013.01); *G06T 5/50* (2013.01); *H04N 23/11* (2023.01); *G06T 2207/10048* (2013.01); *G06T 2207/20221* (2013.01)

(58) Field of Classification Search
   CPC ..................... G06T 3/4015; G06T 5/50; G06T 2207/10048; G06T 2207/20221; H04N 23/11
   See application file for complete search history.

(56) References Cited

U.S. PATENT DOCUMENTS 10,848,681 B2 *  11/2020  Tang ..................... H04N 23/71

FOREIGN PATENT DOCUMENTS

| CN | 109994186 A | 7/2019 |
|---|---|---|
| TW | 200818899 | 4/2008 |

\* cited by examiner

*Primary Examiner* — Mekonen T Bekele
(74) *Attorney, Agent, or Firm* — Winston Hsu (57) ABSTRACT

A time division based band pass image generation method includes acquiring a raw image, de-mosaicing the raw image for generating a red channel image, a green channel image, a blue channel image, and an infrared channel image, generating a single-band pass image during a first time interval according to the red channel image, the green channel image, the blue channel image, and the infrared channel image, generating a dual-band pass image during a second time interval according to the red channel image, the green channel image, the blue channel image, and the infrared channel image, and generating an infrared control signal to control infrared light for filling light of the raw image.

20 Claims, 8 Drawing Sheets

TIME DIVISION BASED BAND PASS IMAGE GENERATION METHOD AND TIME DIVISION BASED BAND PASS IMAGE GENERATION SYSTEM CAPABLE OF GENERATING SINGLE-BAND PASS IMAGES AND DUAL-BAND PASS IMAGES

BACKGROUND OF THE INVENTION

1. Field of the Invention

The present invention illustrates a time division based band pass image generation method and a time division based band pass image generation system, and more particularly, a time division based band pass image generation method and a time division based band pass image generation system capable of generating single-band pass images and dual-band Pass images.

2. Description of the Prior Art

With the rapid development of technology, image monitoring and object identification applications under a bright environment or a dark environment are popularly used for various systems. In order to achieve image recognition under the bright environment and the dark environment, various sensing elements capable of receiving different light signals are required for displaying and analyzing images.

Therefore, developing a band pass image system capable of generating images of different spectra for facilitating image monitoring and object identification applications is an important design issue.

SUMMARY OF THE INVENTION

In an embodiment of the present invention, a time division based band pass image generation method is disclosed. The time division based band pass image generation method comprises acquiring a raw image outputted from a color filter array by an image sensor, performing an interpolation process to demosaic the raw image for generating a red channel image, a green channel image, a blue channel image, and an infrared channel image, generating a single-band pass image during a first time interval by a band pass image processing unit according to the red channel image, the green channel image, the blue channel image, and the infrared channel image, generating a dual-band pass image during a second time interval by the band pass image processing unit according to the red channel image, the green channel image, the blue channel image, and the infrared channel image, generating an infrared light control signal by an infrared light filling control unit for controlling an infrared light filling device, and generating an infrared light signal by the infrared light filling device according to the infrared light control signal. The red channel image, the green channel image, the blue channel image comprise visible light information and invisible light information. The infrared channel image comprises invisible light information. The first time interval and the second time interval are non-overlapped.

In another embodiment of the present invention, a time division based band pass image generation system is disclosed. The time division based band pass image generation system comprises an image sensor configured to acquire a raw image outputted from a color filter array, a signal decoding unit coupled to the image sensor and configured to acquire image information outputted from the image sensor and a plurality of timing signals, a band pass image processing unit coupled to the signal decoding unit and configured to generated a single-band pass image and a dual-band pass image during different time intervals, an image processing and exposure control unit coupled to the image sensor, the band pass image processing unit, and image identification signal control unit and configured to process the single-band pass image and the dual-band pass image independently and configured to control light exposure parameters of the image sensor, an infrared light filling control unit coupled to the image sensor and the image identification signal control unit and configured to generate an infrared light control signal for controlling an infrared light filling device to generate an infrared light signal, and an image and identification signal output unit coupled to the image identification signal control unit and image processing and exposure control unit, and configured to output image identification signals during different time intervals and configured to output a processed single-band pass image and a processed dual-band pass image. The raw image is demosaicked by performing an interpolation process for generating a red channel image, a green channel image, a blue channel image, and an infrared channel image. The band pass image processing unit generates the single-band pass image during a first time interval according to the red channel image, the green channel image, the blue channel image, and the infrared channel image. The band pass image processing unit generates the dual-band pass image during a second time interval according to the red channel image, the green channel image, the blue channel image, and the infrared channel image. The red channel image, the green channel image, and the blue channel image comprise visible light information and invisible light information. The infrared channel image comprises invisible light information. The first time interval and the second time interval are non-overlapped.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
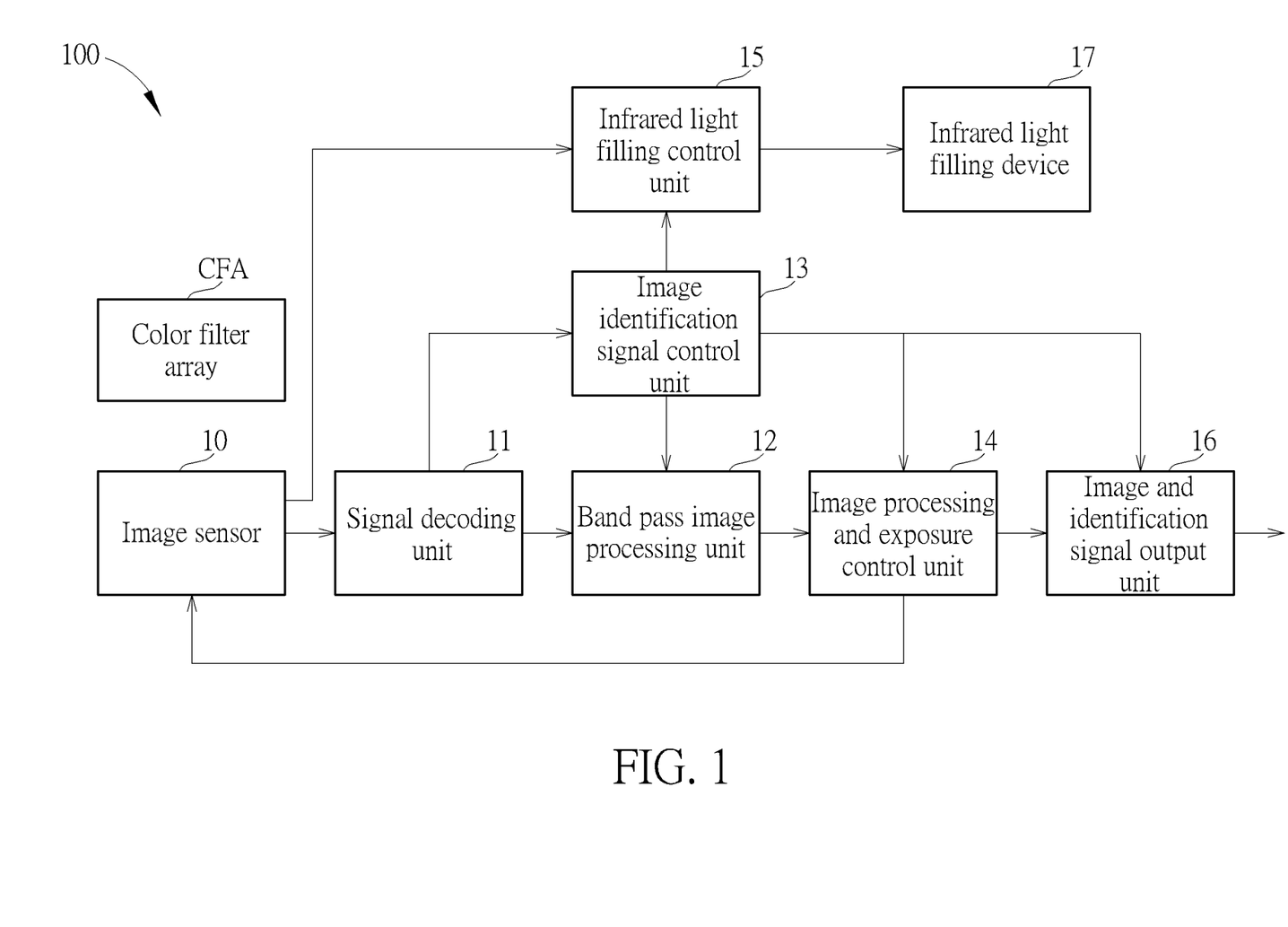
FIG. 1 is a block diagram of a time division based band pass image generation system according to an embodiment of the present invention.

FIG. 1 is a block diagram of a time division based band pass image generation system 100 according to an embodiment of the present invention. The time division based band pass image generation system 100 can generate a single-band pass image and a dual-band Pass image. Therefore, the time division based band pass image generation system 100 can be applied to various image monitoring and object identification applications. The time division based band pass image generation system 100 includes an image sensor 10, a signal decoding unit 11, a band pass image processing unit 12, an image identification signal control unit 13, an image processing and exposure control unit 14, an infrared light filling control unit 15, and an image and identification signal output unit 16. The image sensor 10 is used for acquiring a raw image outputted from a color filter array CFA. The image sensor 10 can be a charge-coupled device (CCD) or a complementary metal oxide semiconductor (CMOS). The color filter array CFA may be an RGBIR color filter array. The signal decoding unit 11 is coupled to the image sensor 10 for acquiring image information outputted from the image sensor 10 and updating a plurality of timing signals (i.e., such as a frame start signal, a frame end signal, a Vsync signal, a blanking signal). The band pass image processing unit 12 is coupled to the signal decoding unit 11 for generating the single-band pass image and the dual-band pass image during different time intervals. The image identification signal control unit 13 is coupled to the signal decoding unit 11 and the band pass image processing unit 12 for generating an image identification signal. The image processing and exposure control unit 14 is coupled to the image sensor 10, the band pass image processing unit 12, and image identification signal control unit 13 for processing the single-band pass image and the dual-band pass image separately and for controlling light exposure parameters of the image sensor 10. The infrared light filling control unit 15 is coupled to the image sensor 10 and the image identification signal control unit 13 for generating an infrared light control signal to control an infrared light filling device 17. Therefore, the infrared light filling device 17 can generate an infrared light signal. The image and identification signal output unit 16 is coupled to the image identification signal control unit 13 and the image processing and exposure control unit 14 for outputting image identification signals during different time intervals and outputting a processed single-band pass image and a processed dual-band pass image. In the time division based band pass image generation system 100, the raw image received by the image sensor 10 through the color filter array CFA can be demosaicked by performing an interpolation process for generating a red channel image, a green channel image, a blue channel image, and an infrared channel image. The band pass image processing unit 12 can generate the single-band pass image during a first time interval according to the red channel image, the green channel image, the blue channel image, and the infrared channel image. Further, the band pass image processing unit 12 can generate the dual-band pass image during a second time interval according to the red channel image, the green channel image, the blue channel image, and the infrared channel image. The red channel image, the green channel image, and the blue channel image include visible light information and invisible light information. The infrared channel image includes invisible light information. The first time interval and the second time interval are non-overlapped. In other words, the time division based band pass image generation system 100 can use a single lens (i.e., one image sensor 10) for separately generating the single-band pass image and the dual-band pass image in different time intervals. Further, the time division based band pass image generation system 100 can use the infrared light filling device 17 for optimizing an imaging resolution. Details of processing the raw image by the time division based band pass image generation system 100 are illustrated below.

Figure 2:
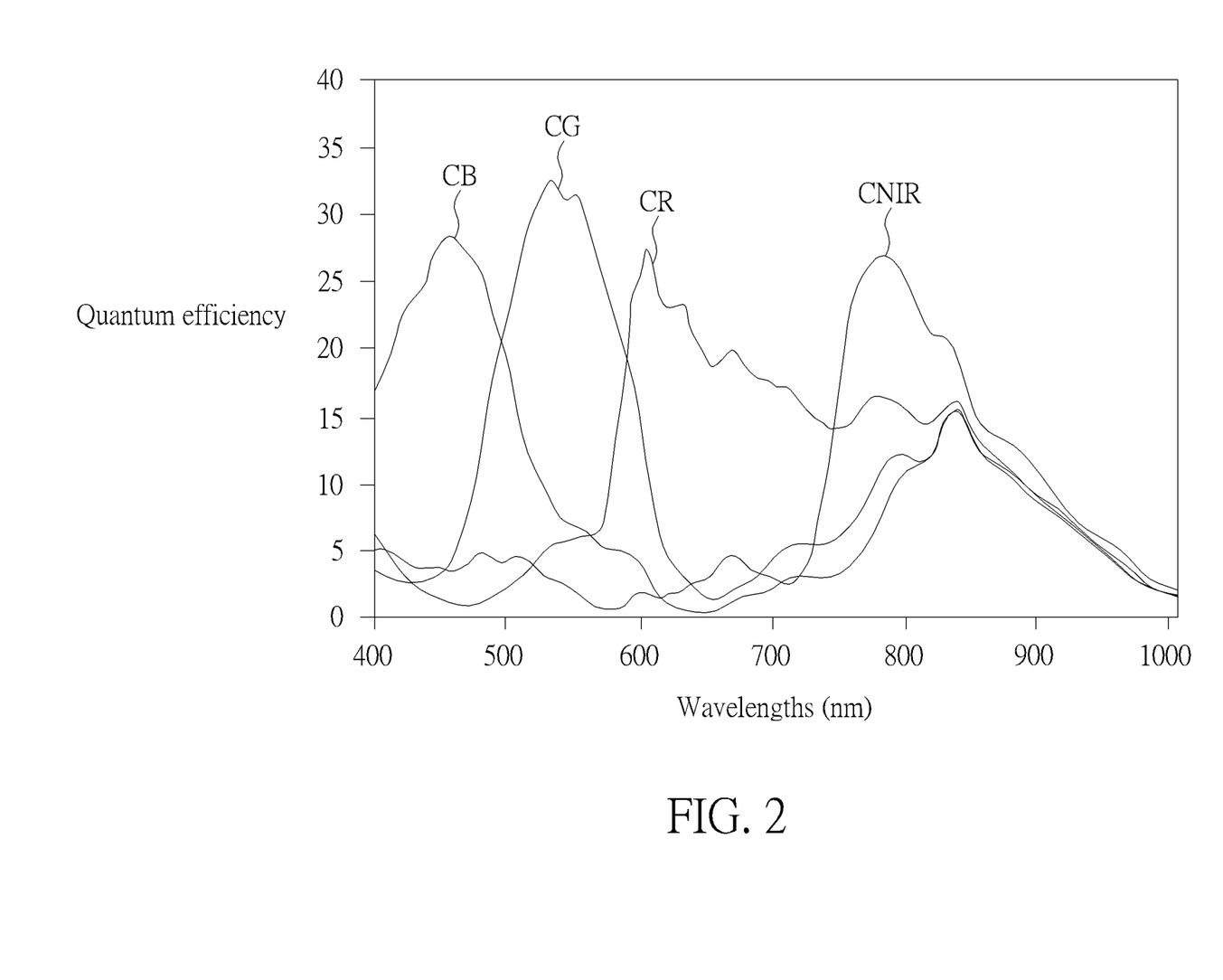
FIG. 2 is an illustration of quantum efficiencies and wavelengths of images received by an image sensor of the time division based band pass image generation system in FIG. 1.

FIG. 2 is an illustration of quantum efficiencies and wavelengths of images received by the image sensor 10 of the time division based band pass image generation system 100. In FIG. 2, X-axis refers to wavelength. Y-axis refers to quantum efficiency. The red channel spectral curve is denoted as CR. The green channel spectral curve is denoted as CG. The blue channel spectral curve is denoted as CB. The infrared channel spectral curve is denoted as CNIR. Further, the wavelength range of a main lobe of the blue channel spectrum curve CB is smaller than the wavelength range of a main lobe of the green channel spectrum curve CG. The wavelength range of a main lobe of the green channel spectral curve CG is smaller than the wavelength range of a main lobe of the red channel spectral curve CR. The wavelength range of a main lobe of the red channel spectral curve CR is smaller than the wavelength range of a main lobe of the infrared channel spectral curve CNIR. Particularly, the wavelength range of the visible light is approximately between 400 nm (nanometer) and 750 nm. Therefore, the red channel spectral curve CR, the green channel spectral curve, and the blue channel spectral curve CB in FIG. 2 can be regarded as spectral curves of the visible light. The infrared channel spectral curve CNIR can be regarded as a spectrum curve of the invisible light.

In the time division based band pass image generation system 100, the image sensor 10 receives the raw image through the color filter array CFA. The raw image received by the image sensor 10 through the color filter array CFA can be regarded as an incomplete color sampling image (i.e. Chroma subsampling). Then, after the signal decoding unit 11 receives the incomplete color sampling image, the incomplete color sampling image can be demosaicked by performing an interpolation process for generating a red channel image, a green channel image, a blue channel image, and an infrared channel image, as illustrated below.

$$(\mathrm{Img}_{iR}, \mathrm{Img}_{iG}, \mathrm{Img}_{iB}, \mathrm{Img}_{iIR}) = f(\mathrm{RAW})$$

Here, $\mathrm{Img}_{iR}$ is denoted as the red channel image, including visible red light energy and invisible light energy. $\mathrm{Img}_{iG}$ is denoted as the green channel image, including visible green light energy and invisible light energy. $\mathrm{Img}_{iB}$ is denoted as the blue channel image, including visible blue light energy and invisible light energy. $\mathrm{Img}_{iIR}$ is denoted as the infrared channel image, which consists of invisible light energy. RAW is denoted as the raw sensor image. f( ) is denoted as an interpolation function. Further, resolutions of the red channel image $\mathrm{Img}_{iR}$, the green channel image $\mathrm{Img}_{iG}$, the blue channel image $\mathrm{Img}_{iB}$, and the infrared channel image $\mathrm{Img}_{iIR}$ are identical. Then, the band pass image processing unit 12 can use the interpolated four-channel images for generating the single-band pass image according to a color correction matrix. Further, the single-band pass image can be a visible light image in a three primary color domain after the infrared light energy is removed. The single-band pass image can also be an invisible light image. Details of generating the single-band pass image are illustrated later.

Figure 3:
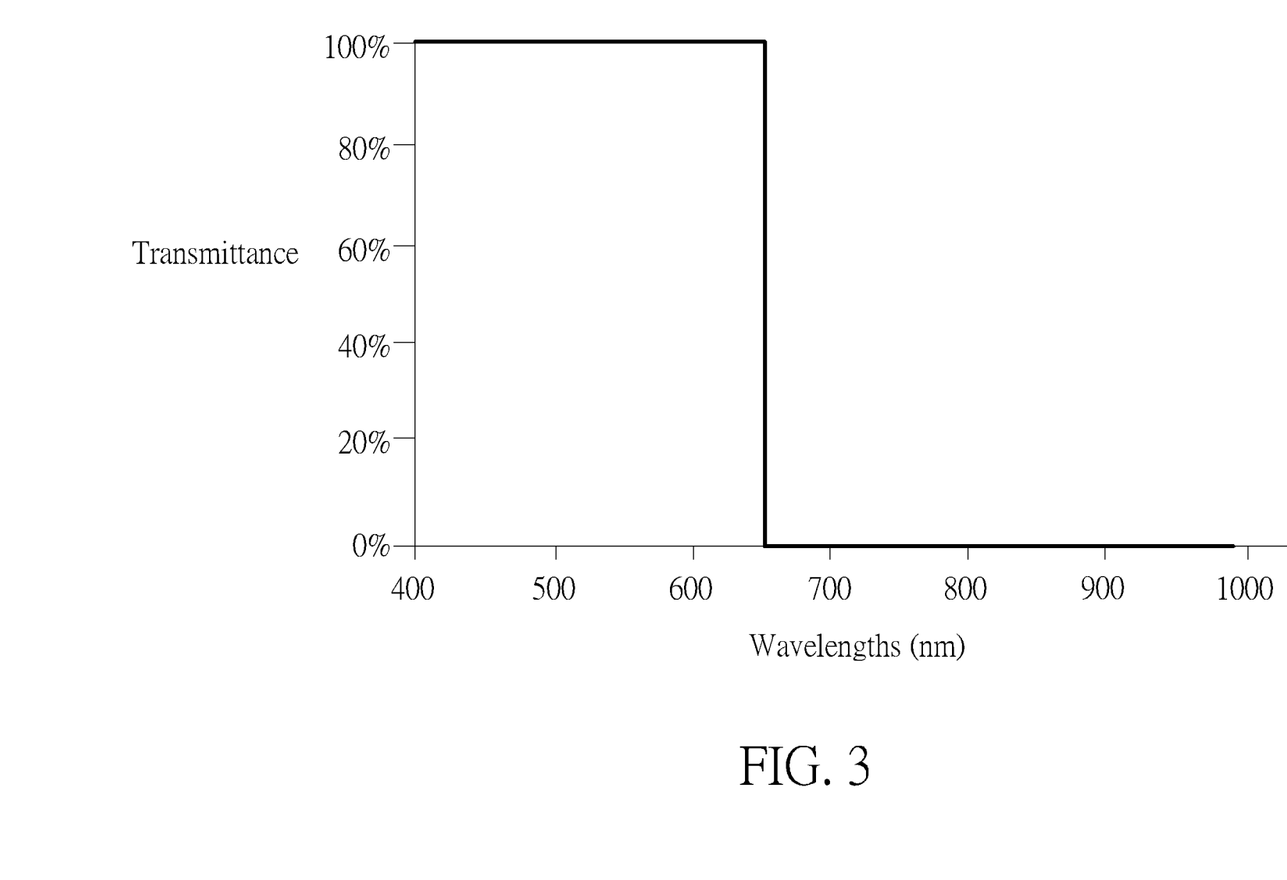
FIG. 3 is an illustration of a light spectrum of a single-band pass image generated by using a first filtering mode of the time division based band pass image generation system in FIG. 1.

FIG. 3 is an illustration of a light spectrum of the single-band pass image generated by using a first filtering mode of the time division based band pass image generation system 100. In the first filtering mode, the single-band pass image generated by the band pass image processing unit 12 is a single-band pass visible light image. As shown in FIG. 3, the single-band pass visible light image can be generated by processing four-channel images through a spectrum filter of the visible light (i.e., such as a wavelength range between 400 nm and 650 nm). In practice, the band pass image processing unit 12 can remove the invisible light information (energy) from the red channel image $Img_{iR}$, the green channel image $Img_{iG}$, and the blue channel image $Img_{iB}$ by linearly combining the red channel image $Img_{iR}$, the green channel image $Img_{iG}$, the blue channel image $Img_{iB}$, and the infrared channel image $Img_{iIR}$ during the first time interval according to at least one predetermined weighting. A color vector (R1, G1, B1) of a single-band pass visible light image can be represented by an output vector of the color correction matrix, as illustrated below.

$$\begin{bmatrix} R1 \\ G1 \\ B1 \end{bmatrix} = \begin{bmatrix} m11 & m12 & m13 & -\alpha1 \\ m21 & m22 & m23 & -\alpha2 \\ m31 & m32 & m33 & -\alpha3 \end{bmatrix} \begin{bmatrix} Img_{iR} \\ Img_{iG} \\ Img_{iB} \\ Img_{iIR} \end{bmatrix}$$

Here, from m11 to m33 are denoted as color correction coefficients. $\alpha1$, $\alpha2$, and $\alpha3$ are denoted as predetermined weightings. The predetermined weightings $\alpha1$, $\alpha2$, and $\alpha3$ can be regarded as coefficients of removing infrared light energy from the ambient light. The predetermined weightings $\alpha1$, $\alpha2$, and $\alpha3$ are positive. In other words, the band pass image processing unit 12 can generate the single-band pass image after the invisible light information (energy) generated according to the predetermined weightings $\alpha1$, $\alpha2$ and $\alpha3$ is removed from the red channel image $Img_{iR}$, the green channel image $Img_{iG}$, and the blue channel image $Img_{iB}$. Therefore, the single-band pass image consists of the visible light information.

Figure 4:
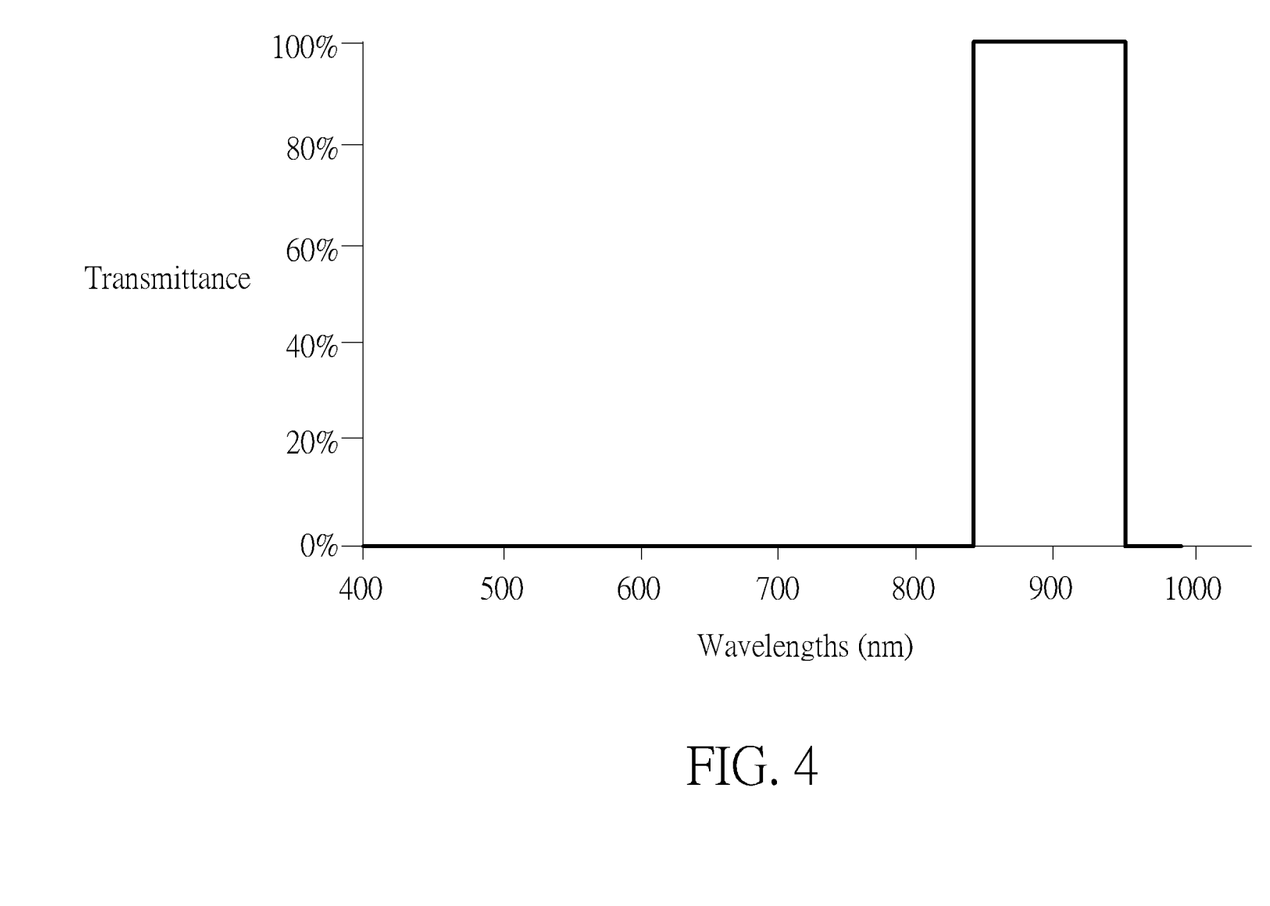
FIG. 4 is an illustration of a light spectrum of a single-band pass image generated by using a second filtering mode of the time division based band pass image generation system in FIG. 1.

FIG. 4 is an illustration of a spectrum of the single-band pass image generated by using a second filtering mode of the time division based band pass image generation system 100. In the second filtering mode, the single-band pass image generated by the band pass image processing unit 12 is a single-band pass invisible light image. As shown in FIG. 4, the single-band pass invisible light image can be generated by processing four-channel images through a spectrum filter of the invisible light (i.e., such as a wavelength range between 840 nm and 950 nm). In practice, the band pass image processing unit 12 can only retain the invisible light information of the infrared channel image $Img_{iIR}$ by linearly combining the red channel image $Img_{iR}$, the green channel image $Img_{iG}$, the blue channel image $Img_{iB}$, and the infrared channel image $Img_{iIR}$ during the first time interval. A color vector (R2, G2, B2) of a single-band pass invisible light image can be represented by an output vector of the color correction matrix, as illustrated below.

$$\begin{bmatrix} R2 \\ G2 \\ B2 \end{bmatrix} = \begin{bmatrix} 0 & 0 & 0 & 1 \\ 0 & 0 & 0 & 1 \\ 0 & 0 & 0 & 1 \end{bmatrix} \begin{bmatrix} Img_{iR} \\ Img_{iG} \\ Img_{iB} \\ Img_{iIR} \end{bmatrix}$$

Here, all color correction coefficients are equal to zero. The infrared light energy is retained. The infrared channel image $Img_{iIR}$ is directly outputted as the color vector (R2, G2, B2) of the single-band pass invisible light image. In other words, the band pass image processing unit 12 generates the single-band pass invisible light image according to the invisible light information of the infrared channel image.

In the time division based band pass image generation system 100, the band pass image processing unit 12 can use the interpolated four-channel images for generating the dual-band pass image according to a color correction matrix. Further, the dual-band pass image can be a reconstructed image in a three primary color domain without removing the infrared light energy. The dual-band pass image can also be a fusing image generated according to the reconstructed image and a portion of infrared light energy. Details of generating the dual-band pass image are illustrated later.

Figure 5:
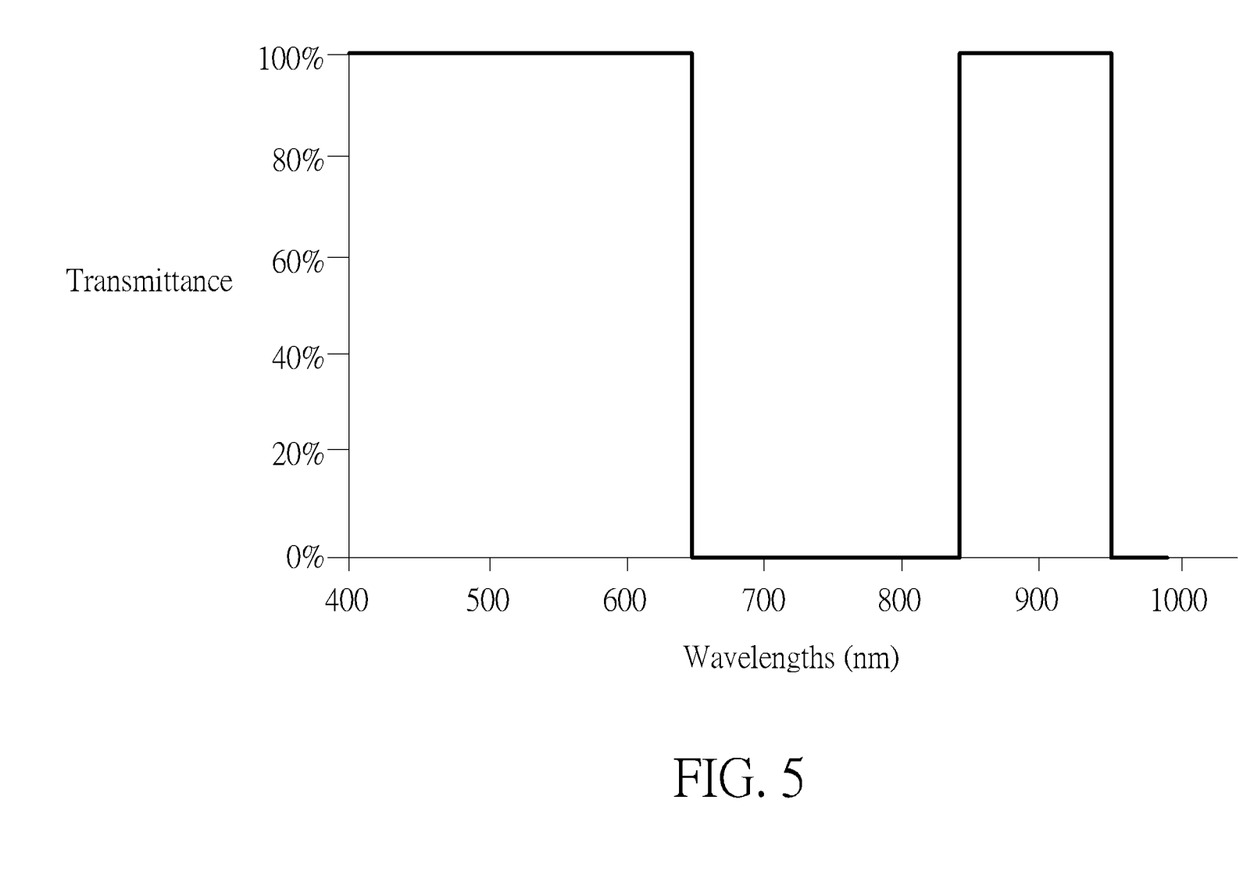
FIG. 5 is an illustration of a light spectrum of a dual-band pass image generated by using a first filtering mode of the time division based band pass image generation system in FIG. 1.

FIG. 5 is an illustration of a spectrum of the dual-band pass image generated by using a first filtering mode of the time division based band pass image generation system 100. In the first filtering mode, the dual-band pass image generated by the band pass image processing unit 12 is the reconstructed image in the three primary color domain without removing the infrared light energy. As shown in FIG. 5, the dual-band pass image can be generated by processing four-channel images through a dual light spectrum filter (i.e., such as a wavelength range between 400 nm and 650 nm, and a wavelength range between 840 nm and 950 nm). In practice, the band pass image processing unit 12 can remove the infrared channel image $Img_{iIR}$ by linearly combining the red channel image $Img_{iR}$, the channel image $Img_{iG}$, the blue channel image $Img_{iB}$, and the infrared channel image $Img_{iIR}$ during the second time interval. A color vector (R3, G3, B3) of the dual-band pass image can be represented by an output vector of the color correction matrix, as illustrated below.

$$\begin{bmatrix} R3 \\ G3 \\ B3 \end{bmatrix} = \begin{bmatrix} 1 & 0 & 0 & 0 \\ 0 & 1 & 0 & 0 \\ 0 & 0 & 1 & 0 \end{bmatrix} \begin{bmatrix} Img_{iR} \\ Img_{iG} \\ Img_{iB} \\ Img_{iIR} \end{bmatrix}$$

Here, color correction coefficients can be regarded as coefficients of a 3×3 identity matrix. The infrared channel image $Img_{iIR}$ is removed. The color vector (R3, G3, B3) of the dual-band pass image can be regarded as the red channel image $Img_{iR}$, the green channel image Imgis, and the blue channel image $Img_{iB}$ directly outputted from the color correction matrix. In other words, the band pass image processing unit 12 generates the dual-band pass image after the infrared channel image $Img_{iIR}$ is removed. The dual-band pass image includes the visible light information and the invisible light information in the RGB domain.

Figure 6:
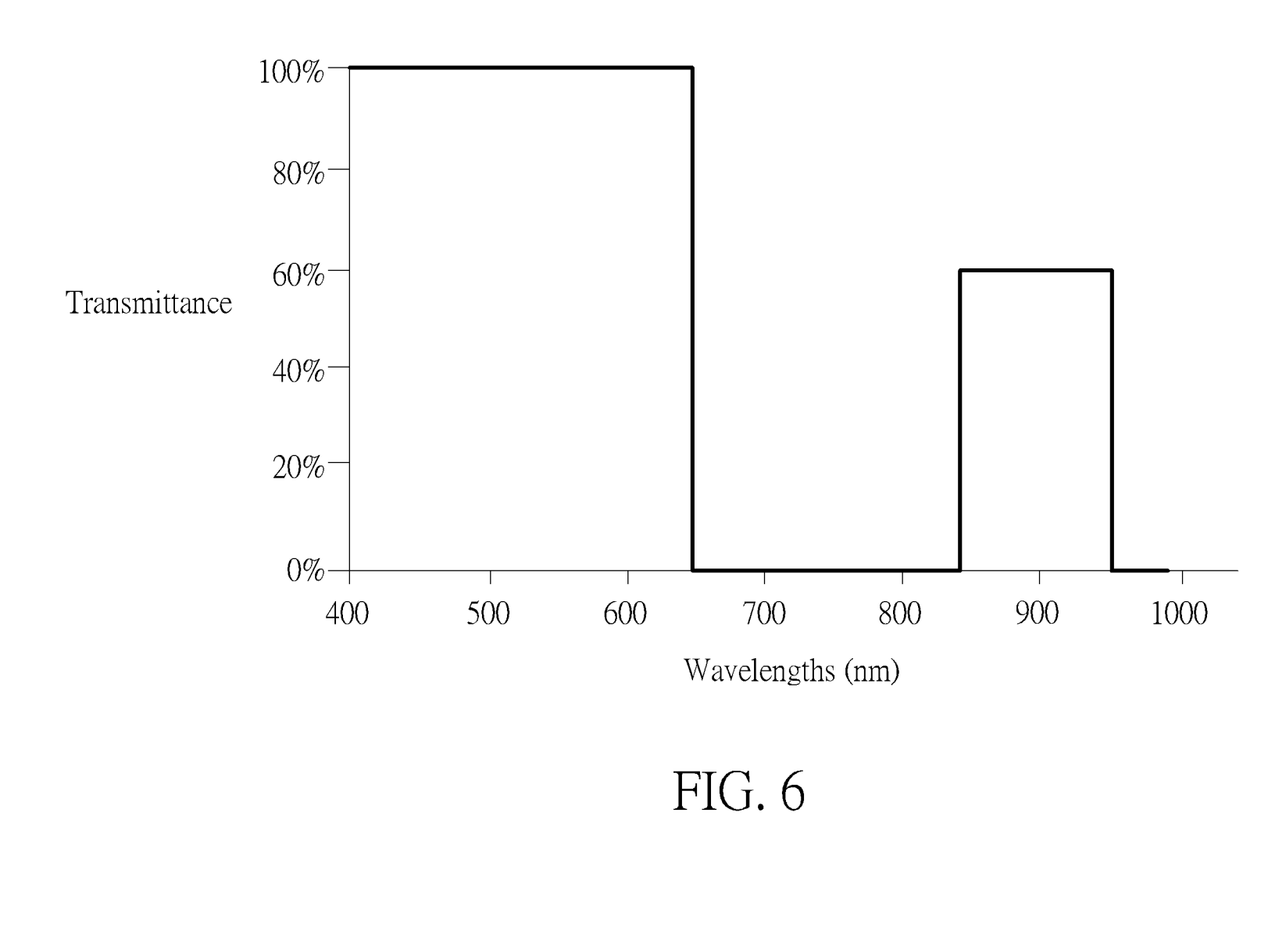
FIG. 6 is an illustration of a light spectrum of a dual-band pass image generated by using a second filtering mode of the time division based band pass image generation system in FIG. 1.

FIG. 6 is an illustration of a light spectrum of the dual-band pass image generated by using a second filtering mode of the time division based band pass image generation system 100. In the second filtering mode, the dual-band pass image generated by the band pass image processing unit 12 is the fusing image generated according to the reconstructed image and the portion of infrared light energy (hereafter, say, a dual-band pass fusing image). As shown in FIG. 6, the dual-band pass fusing image can be generated by processing four-channel images through a dual light spectrum filter (i.e., such as a wavelength range between 400 nm and 650 nm, and a wavelength range between 840 nm and 950 nm) having different gains. In practice, the band pass image processing unit 12 fuses invisible light energy with the red channel image $Img_{iR}$, the green channel image $Img_{iG}$, and the blue channel image $Img_{iB}$ according to at least one predetermined fusion ratio by linearly combining the red channel image $Img_{iR}$, the green channel image $Img_{iG}$, the blue channel image $Img_{iB}$, and the infrared channel image $Img_{iIR}$ during the second time interval. A color vector (R4, G4, B4) of the dual-band pass fusing image can be represented by an output vector of the color correction matrix, as illustrated below.

$$\begin{bmatrix} R4 \\ G4 \\ B4 \end{bmatrix} = \begin{bmatrix} 1-\beta 1 & 0 & 0 & \beta 1 \\ 0 & 1-\beta 2 & 0 & \beta 2 \\ 0 & 0 & 1-\beta 3 & \beta 3 \end{bmatrix} \begin{bmatrix} Img_{iR} \\ Img_{iG} \\ Img_{iB} \\ Img_{iIR} \end{bmatrix}$$

Here, color correction coefficients are coefficients of a 3×3 diagonal matrix. The infrared channel image $Img_{iIR}$ is fused with each visible channel image according to a predetermined fusion ratio. For example, β1% of infrared channel image $Img_{iIR}$ is fused with (1-31) % of red channel image $Img_{iR}$. 2% of infrared channel image $Img_{iIR}$ is fused with (1-32) % of green channel image $Img_{iG}$. 33% of infrared channel image $Img_{iR}$ is fused with (1-β33) % of blue channel image $Img_{iB}$. The predetermined fusion ratios β1, β2, and β3 are between zero and one. In other words, the band pass image processing unit 12 generates the dual-band pass image after the invisible light energy is fused with the red channel image $Img_{iR}$, the green channel image $Img_{iG}$, and the blue channel image $Img_{iB}$. The dual-band pass image includes the visible light energy and the invisible light energy. Further, weightings of the visible light energy and the invisible light energy can be adjusted.

In the time division based band pass image generation system 100, the image processing and exposure control unit 14 can process the single-band pass image generated during the first time interval and the dual-band pass image generated during the second time interval separately, such as by performing a white balance correction process, a noise filtering process and a color correction process. Further, the image identification signal control unit 13 can generate an image identification signal according to an index of an image frame for indicating the single-band pass image or the dual-band pass image. For example, the image identification signal control unit 13 can generate the image identification signal according to a currently updated timing signal of the screen. The image identification signal can be used for controlling the infrared light filling control unit 15, the band pass image processing unit 12, the image processing and exposure control unit 14, and the identification signal output unit 16. In an embodiment, the image identification signal includes a first value (i.e., "1") and a second value (i.e., "0"). The first value (i.e., "1") corresponds to an image frame having an odd index. The second value (i.e., "0") corresponds to an image frame having an even index. The time lengths of the first time interval and the second time interval are equal to a period of the image frame. Therefore, the image and identification signal output unit 16 can output the processed single-band pass image generated during the first time interval and the processed dual-band pass image generated during the second time interval.

Figure 7:
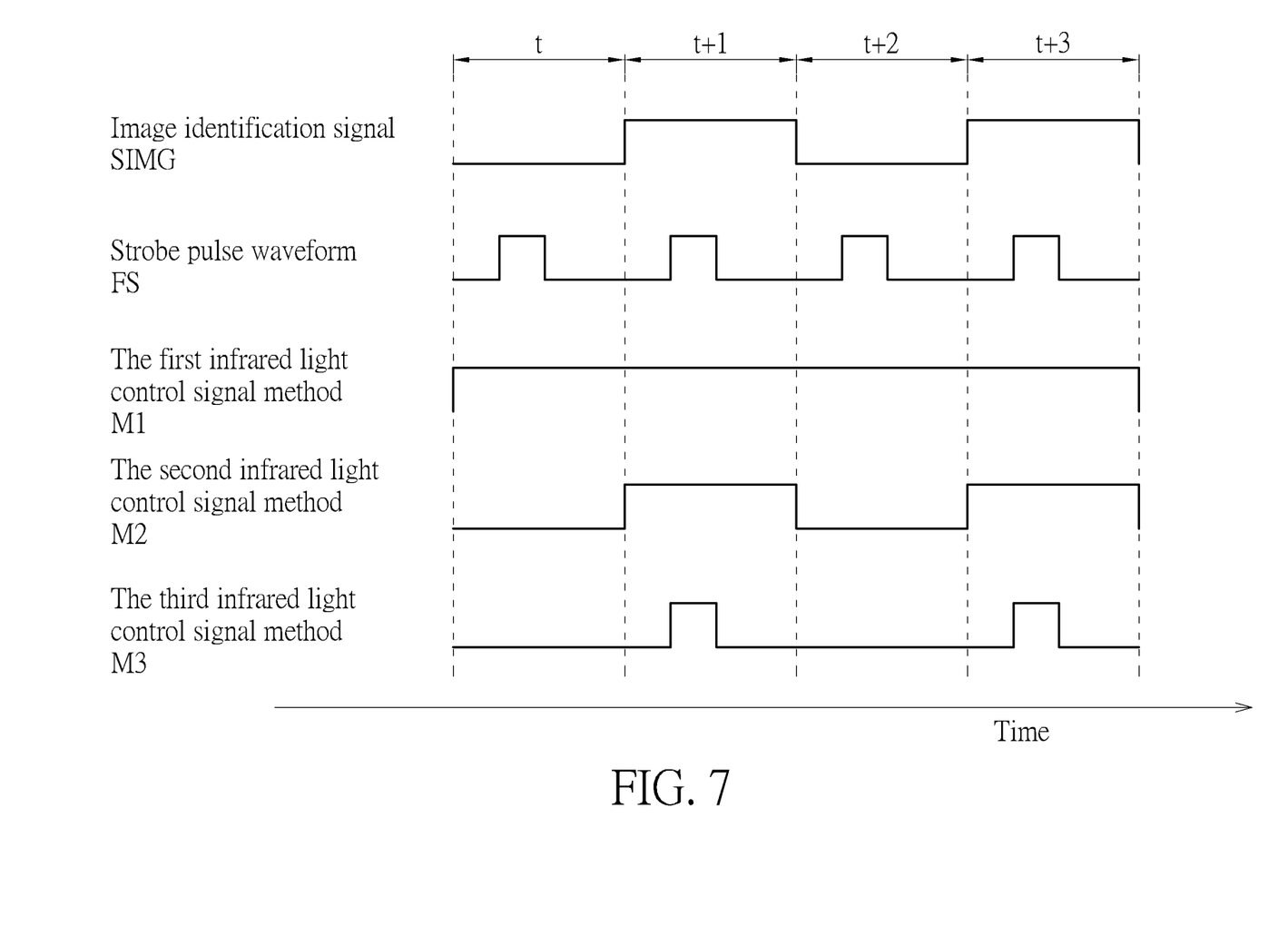
FIG. 7 is an illustration of waveforms of infrared light control signals under various methods of the time division based band pass image generation system in FIG. 1.

FIG. 7 is an illustration of waveforms of infrared light control signals under various modes of the time division based band pass image generation system 100. X-axis is a time axis. In FIG. 7, three waveforms of the infrared light control signals are introduced, such as the first infrared light control signal method M1, the second infrared light control signal method M2, and the third infrared light control signal method M3. Here, t is a time index. In a first mode, the infrared light filling control unit 15 can generate the first infrared light control signal method M1 for controlling the infrared light filling device 17 to generate an infrared light control signal having constant brightness. In a second mode, the infrared light filling control unit 15 can generate the second infrared light control signal method M2 according to the image identification signal SIMG. Specifically, the infrared light filling control unit 15 controls the infrared light filling device 17 to generate an infrared light control signal during the second time interval (i.e., such as a time interval t+1 and a time interval t+3). As a result, the infrared light filling device 17 can generate the infrared light signal during the second time interval for filling the light of the dual-band pass image. In a third mode, the infrared light filling control unit 15 can acquire a strobe pulse waveform FS. Further, the infrared light filling control unit 15 can generate the third infrared light control signal method M3 according to the strobe pulse waveform FS and the image identification signal SIMG. Therefore, the infrared light filling device 17 can generate an infrared light signal within a raw image exposure interval of the second time interval (i.e., such as the time interval t+1 and the time interval t+3) according to the third infrared light control signal method M3. However, the three modes of controlling the infrared light filling device 17 by the infrared light filling control unit 15 is not limited in FIG. 7. For example, in the second mode and the third mode, the infrared light filling device 17 can enable or disable the infrared light signal during the first time interval according to requirements of the single-band pass image.

Figure 8:
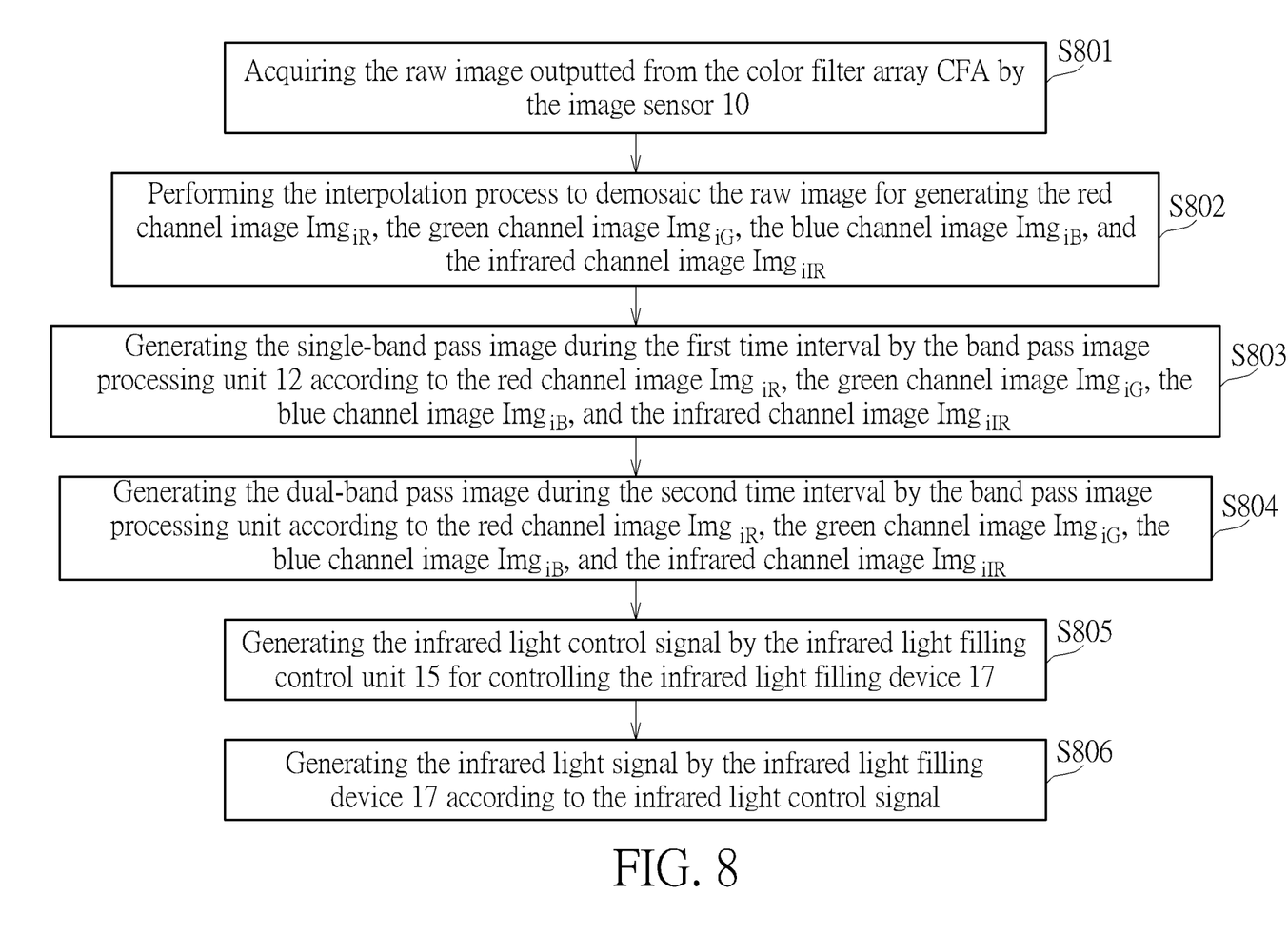
FIG. 8 is a flow chart of performing a time division based band pass image generation method by the time division based band pass image generation system in FIG. 1.

FIG. 8 is a flow chart of performing a time division based band pass image generation method by the time division based band pass image generation system 100. The time division based band pass image generation method includes step S801 to step S806. Any reasonable hardware or technology modification falls with the scope of the present invention. Step S801 to step S806 are illustrated below.

Step S801: acquiring the raw image outputted from the color filter array CFA by the image sensor 10;

Step S802: performing the interpolation process to demosaic the raw image for generating the red channel image ImgiR, the green channel image ImgiG, the blue channel image ImgiB, and the infrared channel image ImgiIR;

Step S803: generating the single-band pass image during the first time interval by the band pass image processing unit 12 according to the red channel image ImgiR, the green channel image ImgiG, the blue channel image ImgiB, and the infrared channel image ImgiIR;

Step S804: generating the dual-band pass image during the second time interval by the band pass image processing unit according to the red channel image ImgiR, the green channel image ImgiG, the blue channel image ImgiB, and the infrared channel image ImgiIR;

Step S805: generating the infrared light control signal by the infrared light filling control unit 15 for controlling the infrared light filling device 17;

Step S806: generating the infrared light signal by the infrared light filling device 17 according to the infrared light control signal.

Details of step S801 to step S806 are previously illustrated. Thus, they are omitted here. The time division based band pass image generation system 100 can generate the single-band pass image and the dual-band pass image in different time intervals. Further, the time division based band pass image generation system 100 can introduce infrared light filling technologies under various modes for improving an exposure quality of the dual-band pass image.

To sum up, the present invention discloses a time division based band pass image generation method and a time division based band pass image generation system. The time division based band pass image generation system can use the band pass image processing unit for separately and independently processing the raw image outputted from the color filter array. Therefore, the band pass image processing unit can generate the single-band pass image and the dual-band pass image in different time intervals under various modes. Further, the dual-band pass image can include visible light information and invisible light information. For example, the dual-band pass image can be the reconstructed image in the three primary color domain without removing the infrared light energy. The dual-band pass image can also be the fusing image generated according to the reconstructed image and the portion of infrared light energy. Further, the time division based band pass image generation system can introduce various infrared light filling modes for improving the exposure quality of the dual-band pass image. As a result, the time division based band pass image generation system can be applied to various image monitoring and object identification applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A time division based band pass image generation method comprising:
   acquiring a raw image outputted from a color filter array by an image sensor;
   performing an interpolation process to demosaic the raw image for generating a red channel image, a green channel image, a blue channel image, and an infrared channel image;
   generating a single-band pass image during a first time interval by a band pass image processing unit according to the red channel image, the green channel image, the blue channel image, and the infrared channel image;
   generating a dual-band pass image during a second time interval by the band pass image processing unit according to the red channel image, the green channel image, the blue channel image, and the infrared channel image;
   generating an infrared light control signal by an infrared light filling control unit for controlling an infrared light filling device; and
   generating an infrared light signal by the infrared light filling device according to the infrared light control signal;
   wherein the red channel image, the green channel image, and the blue channel image comprise visible light information and invisible light information, the infrared channel image comprises invisible light information, and the first time interval and the second time interval are non-overlapped.

2. The method of claim 1, wherein resolutions of the red channel image, the green channel image, the blue channel image, and the infrared channel image are identical.

3. The method of claim 1, wherein generating the single-band pass image during the first time interval by the band pass image processing unit according to the red channel image, the green channel image, the blue channel image, and the infrared channel image comprises:
   the band pass image processing unit removing the invisible light information from the red channel image, the green channel image, and the blue channel image by linearly combining the red channel image, the green channel image, the blue channel image, and the infrared channel image during the first time interval according to at least one predetermined weighting; and
   generating the single-band pass image by the band pass image processing unit after the invisible light information generated according to the at least one predetermined weighting is removed from the red channel image, the green channel image, and the blue channel image;
   wherein the predetermined weighting is positive, and the single-band pass image consists of the visible light information.

4. The method of claim 1, wherein generating the single-band pass image during the first time interval by the band pass image processing unit according to the red channel image, the green channel image, the blue channel image, and the infrared channel image comprises:
   the band pass image processing unit only retaining the invisible light information of the infrared channel image by linearly combining the red channel image, the green channel image, the blue channel image, and the infrared channel image during the first time interval; and
   generating the single-band pass image by the band pass image processing unit according to the invisible light information of the infrared channel image.

5. The method of claim 1, wherein generating the dual-band pass image during the second time interval by the band pass image processing unit according to the red channel image, the green channel image, the blue channel image, and the infrared channel image comprises:
   the band pass image processing unit removing the infrared channel image by linearly combining the red channel image, the green channel image, the blue channel image, and the infrared channel image during the second time interval; and
   generating the dual-band pass image by the band pass image processing unit after the infrared channel image is removed;
   wherein the dual-band pass image comprises the visible light information and the invisible light information.

6. The method of claim 1, wherein generating the dual-band pass image during the second time interval by the band pass image processing unit according to the red channel image, the green channel image, the blue channel image, and the infrared channel image comprises:
   the band pass image processing unit fusing an invisible light energy with the red channel image, the green channel image, and the blue channel image according to at least one predetermined fusion ratio by linearly combining the red channel image, the green channel image, the blue channel image, and the infrared channel image during the second time interval; and generating the dual-band pass image by the band pass image processing unit after the invisible light energy is fused with the red channel image, the green channel image, and the blue channel image;

wherein the at least one predetermined fusion ratio is between zero and one, and the dual-band pass image comprises the visible light information and the invisible light information.

7. The method of claim 1, further comprising:

processing the single-band pass image generated during the first time interval and the dual-band pass image generated during the second time interval separately; and outputting a processed single-band pass image generated during the first time interval and a processed dual-band pass image generated during the second time interval.

8. The method of claim 1, further comprising:

generating an image identification signal according to an index of an image frame for indicating the single-band pass image or the dual-band pass image;

wherein the image identification signal comprises a first value and a second value, the first value corresponds to an image frame having an odd index number, and the second value corresponds to an image frame having an even index number.

9. The method of claim 8, wherein the infrared light filling control unit generates the infrared light control signal according to the image identification signal, the infrared light filling device generates the infrared light signal during the second time interval according to the infrared light control signal for filling light of the dual-band pass image.

10. The method of claim 8, wherein the infrared light filling control unit acquires a strobe pulse waveform, the infrared light filling control unit generates the infrared light control signal according to the image identification signal and the strobe pulse waveform, the infrared light filling device generates the infrared light signal within a raw image exposure interval of the second time interval according to the infrared light control signal, and the infrared light filling device enables or disables the infrared light signal during the first time interval according to requirements of the single-band pass image.

11. A time division based band pass image generation system comprising:

an image sensor configured to acquire a raw image outputted from a color filter array;

a signal decoding unit coupled to the image sensor and configured to acquire image information outputted from the image sensor and a plurality of timing signals;

a band pass image processing unit coupled to the signal decoding unit and configured to generate a single-band pass image and a dual-band pass image during different time intervals;

an image identification signal control unit coupled to the signal decoding unit and the band pass image processing unit and configured to generate an image identification signal;

an image processing and exposure control unit coupled to the image sensor, the band pass image processing unit, and image identification signal control unit and configured to process the single-band pass image and the dual-band pass image separately and configured to control exposure parameters of the image sensor;

an infrared light filling control unit coupled to the image sensor and the image identification signal control unit and configured to generate an infrared light control signal for controlling an infrared light filling device to generate an infrared light signal; and an image and identification signal output unit coupled to the image identification signal control unit and the image processing and exposure control unit, and configured to output image identification signals during different time intervals and configured to output a processed single-band pass image and a processed dual-band pass image;

wherein the raw image is demosaicked by performing an interpolation process for generating a red channel image, a green channel image, a blue channel image, and an infrared channel image, the band pass image processing unit generates the single-band pass image during a first time interval according to the red channel image, the green channel image, the blue channel image, and the infrared channel image, the band pass image processing unit generates the dual-band pass image during a second time interval according to the red channel image, the green channel image, the blue channel image, and the infrared channel image, the red channel image, the green channel image, and the blue channel image comprise visible light information and invisible light information, the infrared channel image comprises invisible light information, and the first time interval and the second time interval are non-overlapped.

12. The system of claim 11, wherein resolutions of the red channel image, the green channel image, the blue channel image, and the infrared channel image are identical.

13. The system of claim 11, wherein the band pass image processing unit removes the invisible light information from the red channel image, the green channel image, and the blue channel image by linearly combining the red channel image, the green channel image, the blue channel image, and the infrared channel image during the first time interval according to at least one predetermined weighting, the band pass image processing unit generates the single-band pass image after the invisible light information generated according to the at least one predetermined weighting is removed from the red channel image, the green channel image, and the blue channel image, the predetermined weighting is positive, and the single-band pass image consists of the visible light information.

14. The system of claim 11, wherein the band pass image processing unit only retains the invisible light information of the infrared channel image by linearly combining the red channel image, the green channel image, the blue channel image, and the infrared channel image during the first time interval, and the band pass image processing unit generates the single-band pass image according to the invisible light information of the infrared channel image.

15. The system of claim 11, wherein the band pass image processing unit removes the infrared channel image by linearly combining the red channel image, the green channel image, the blue channel image, and the infrared channel image during the second time interval, the band pass image processing unit generates the dual-band pass image after the infrared channel image is removed, and the dual-band pass image comprises the visible light information and the invisible light information.

16. The system of claim 11, wherein the band pass image processing unit fuses an invisible light energy with the red channel image, the green channel image, and the blue channel image according to at least one predetermined fusion ratio by linearly combining the red channel image, the green channel image, the blue channel image, and the infrared channel image during the second time interval, the band pass image processing unit generates the dual-band pass image after the invisible light energy is fused with the red channel image, the green channel image, and the blue channel image, the at least one predetermined fusion ratio is between zero and one, and the dual-band pass image comprises the visible light information and the invisible light information.

17. The system of claim 11, wherein the image processing and exposure control unit processes the single-band pass image generated during the first time interval and the dual-band pass image generated during the second time interval separately, and the image and identification signal output unit outputs the processed single-band pass image generated during the first time interval and the processed dual-band pass image generated during the second time interval.

18. The system of claim 11, wherein the image identification signal control unit generates an image identification signal according to an index of an image frame for indicating the single-band pass image or the dual-band pass image, the image identification signal comprises a first value and a second value, the first value corresponds to an image frame having an odd index number, and the second value corresponds to an image frame having an even index number.

19. The system of claim 18, wherein the infrared light filling control unit generates the infrared light control signal according to the image identification signal, the infrared light filling device generates the infrared light signal during the second time interval according to the infrared light control signal for filling light of the dual-band pass image.

20. The system of claim 18, wherein the infrared light filling control unit acquires a strobe pulse waveform, the infrared light filling control unit generates the infrared light control signal according to the image identification signal and the strobe pulse waveform, the infrared light filling device generates the infrared light signal within a raw image exposure interval of the second time interval according to the infrared light control signal, and the infrared light filling device enables or disables the infrared light signal during the first time interval according to requirements of the single-band pass image.

* * * * *